United States Patent
Yelahanka Raghuprasad et al.

(10) Patent No.: US 12,301,457 B2
(45) Date of Patent: May 13, 2025

(54) DYNAMIC INPUT GRANULARITY ESTIMATION FOR NETWORK PATH FORECASTING USING TIMESERIES FEATURES

(71) Applicant: Cisco Technology, Inc., San Jose, CA (US)

(72) Inventors: Mukund Yelahanka Raghuprasad, San Jose, CA (US); Vinay Kumar Kolar, San Jose, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 349 days.

(21) Appl. No.: 17/874,497

(22) Filed: Jul. 27, 2022

(65) Prior Publication Data
US 2024/0039842 A1   Feb. 1, 2024

(51) Int. Cl.
*H04L 43/087* (2022.01)
*H04L 43/0829* (2022.01)
*H04L 43/0888* (2022.01)
*H04L 45/00* (2022.01)

(52) U.S. Cl.
CPC .......... *H04L 45/70* (2013.01); *H04L 43/0829* (2013.01); *H04L 43/087* (2013.01); *H04L 43/0888* (2013.01)

(58) Field of Classification Search
CPC .............. H04L 43/0829; H04L 43/087; H04L 43/0888; H04L 45/00; H04L 45/70
See application file for complete search history.

(56) References Cited

U.S. PATENT DOCUMENTS

| | | | |
|---|---|---|---|
| 7,778,165 B2 * | 8/2010 | Madhyastha | H04L 41/12 370/254 |
| 8,189,489 B2 * | 5/2012 | Zhang | H04L 43/00 370/252 |
| 9,148,347 B2 | 9/2015 | Galloway et al. | |
| 9,813,259 B2 * | 11/2017 | Vasseur | H04L 43/062 |
| 9,860,819 B2 * | 1/2018 | Courtice | H04W 40/12 |
| 10,062,036 B2 * | 8/2018 | Mermoud | H04L 41/16 |
| 10,193,910 B2 * | 1/2019 | Xue | H04L 41/142 |
| 10,560,940 B2 * | 2/2020 | Calin | H04L 43/0811 |
| 10,972,387 B2 * | 4/2021 | Iyer | H04L 43/08 |
| 11,063,842 B1 | 7/2021 | Vasseur et al. | |
| 11,159,447 B2 | 10/2021 | Vasseur et al. | |
| 11,296,964 B2 | 4/2022 | Kumar et al. | |
| 11,463,365 B1 * | 10/2022 | Vasseur | H04L 47/122 |
| 11,665,261 B1 * | 5/2023 | Carofiglio | H04L 43/0823 709/224 |
| 11,909,618 B2 * | 2/2024 | Kolar | H04L 43/50 |
| 2021/0314231 A1 | 10/2021 | Madhavan | |

(Continued)

*Primary Examiner* — Alpus Hsu
(74) *Attorney, Agent, or Firm* — BEHMKE INNOVATION GROUP LLC; James M. Behmke; James J. Wong

(57) ABSTRACT

In one embodiment, a device identifies peaks of a timeseries of a path metric used to predict performance of a path in a network. The device determines one or more characteristics of the peaks of the timeseries. The device computes, based on the one or more characteristics of the peaks, a measurement frequency for the path metric. The device causes the path metric to be measured in the network according to the measurement frequency.

19 Claims, 15 Drawing Sheets

(56) References Cited

U.S. PATENT DOCUMENTS

2021/0359915 A1 11/2021 Ohlsson et al.
2022/0052927 A1* 2/2022 Yelahanka Raghuprasad ............
H04L 41/5025

* cited by examiner

DYNAMIC INPUT GRANULARITY ESTIMATION FOR NETWORK PATH FORECASTING USING TIMESERIES FEATURES

TECHNICAL FIELD

The present disclosure relates generally to computer networks, and, more particularly, to dynamic input granularity estimation for network path forecasting using timeseries features.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive routing in an SDN/SD-WAN or other network now becomes possible through the use of machine learning techniques. For instance, modeling path metrics such as delay, jitter, packet loss, etc. for a network path can be used to predict when that path will violate the SLA of the application and reroute the traffic, in advance. While a predictive routing system can be constructed to be dynamic in nature, in order to adapt quickly to changing path metrics, the input data to such a system often remains the same in terms of the granularity of the path metric timeseries used as input and its length of history. Testing has shown that this granularity and length of history can often be too small or too large, depending on the features of the timeseries, leading to poor model performance.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
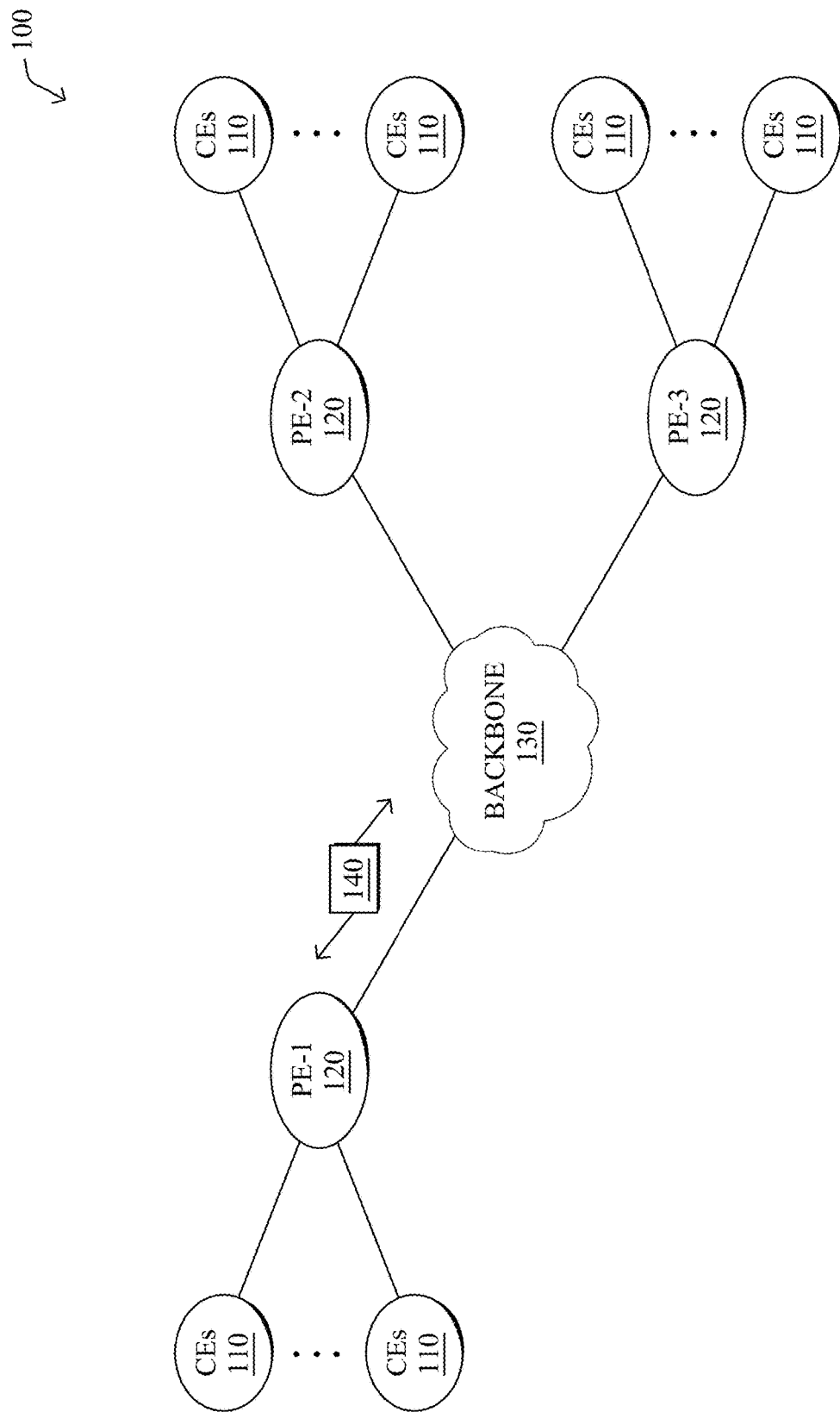
FIGS. 1A-1B illustrate an example communication network.

According to one or more embodiments of the disclosure, a device identifies peaks of a timeseries of a path metric used to predict performance of a path in a network. The device determines one or more characteristics of the peaks of the timeseries. The device computes, based on the one or more characteristics of the peaks, a measurement frequency for the path metric. The device causes the path metric to be measured in the network according to the measurement frequency.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
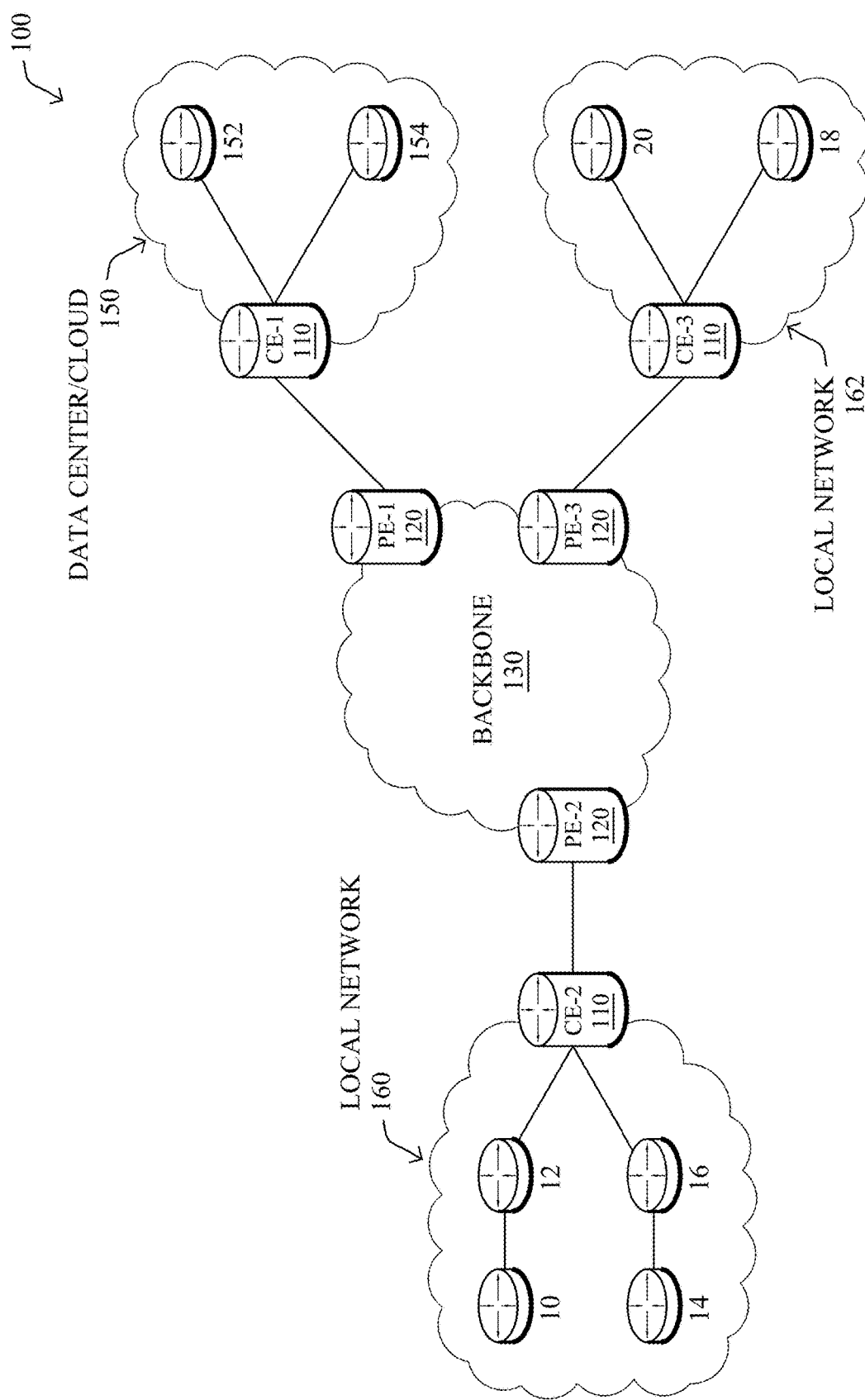

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
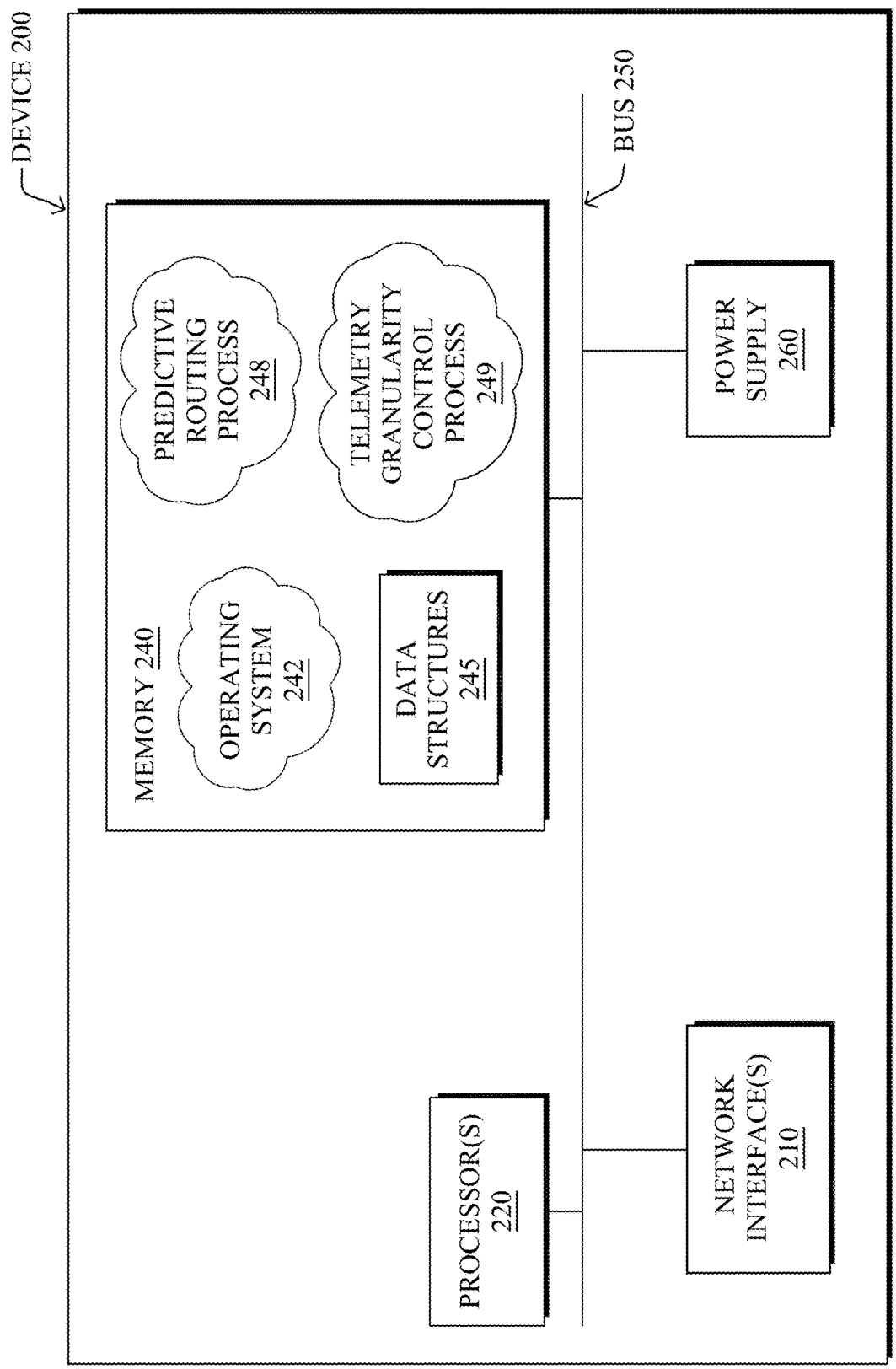
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a telemetry granularity control process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 and/or telemetry granularity control process 249 include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 and/or telemetry granularity control process 249 may include computer executable instructions that, when executed by processor(s) 220, cause device 200 to perform the techniques described herein. To do so, in some embodiments, predictive routing process 248 and/or telemetry granularity control process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or telemetry granularity control process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or telemetry granularity control process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
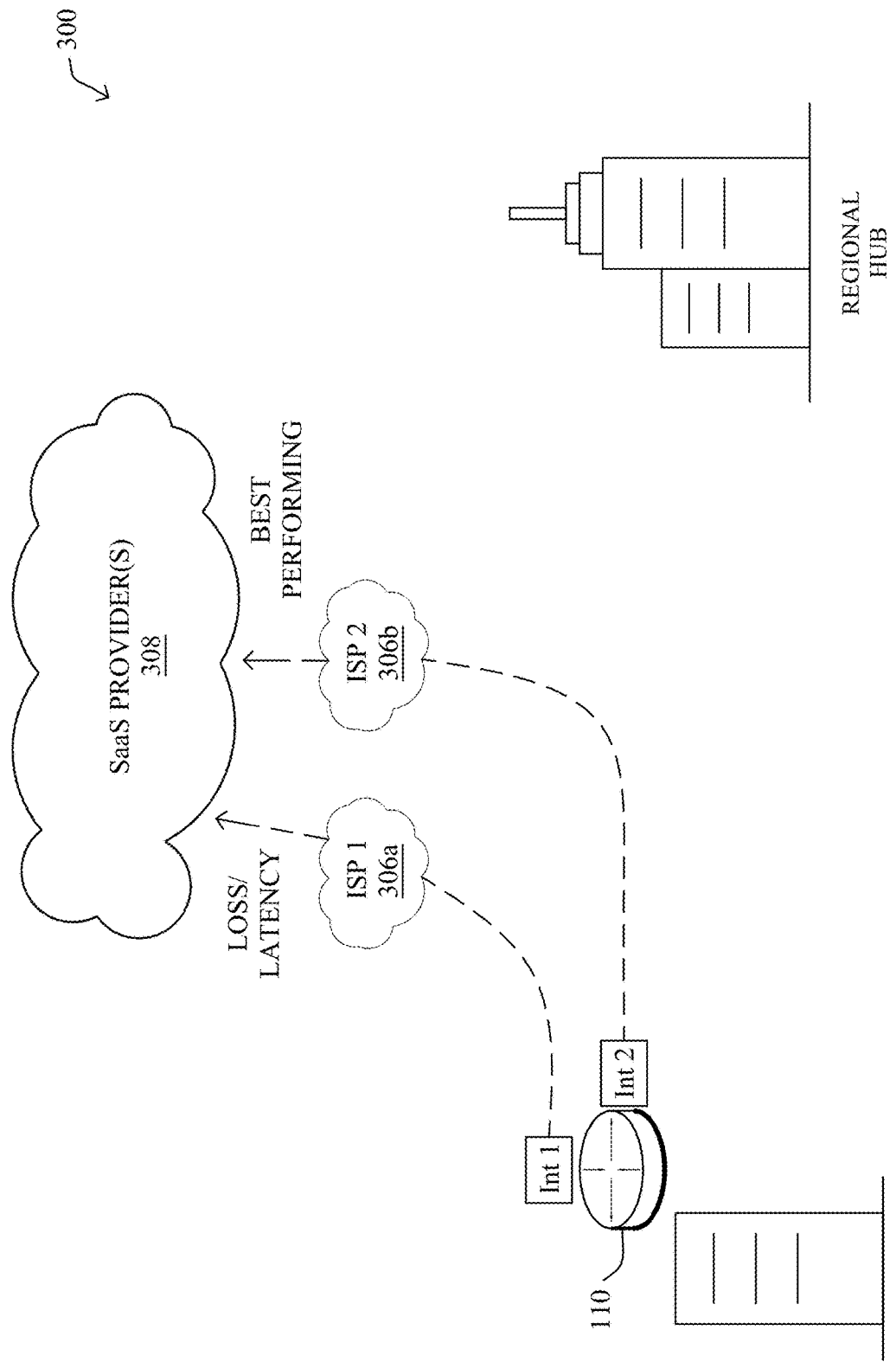
FIGS. 3A-3B illustrate example network deployments.
Figure 3B:
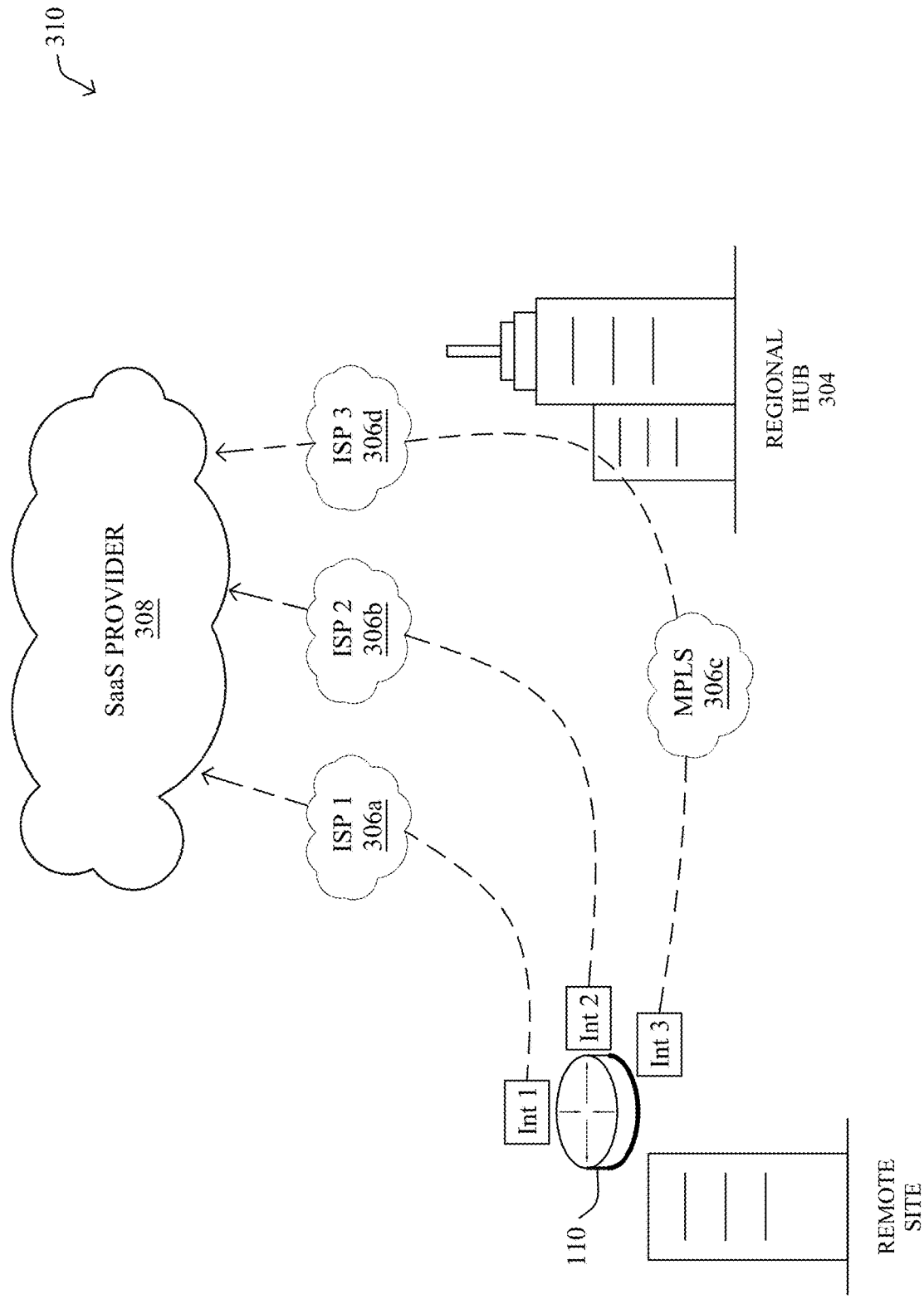

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
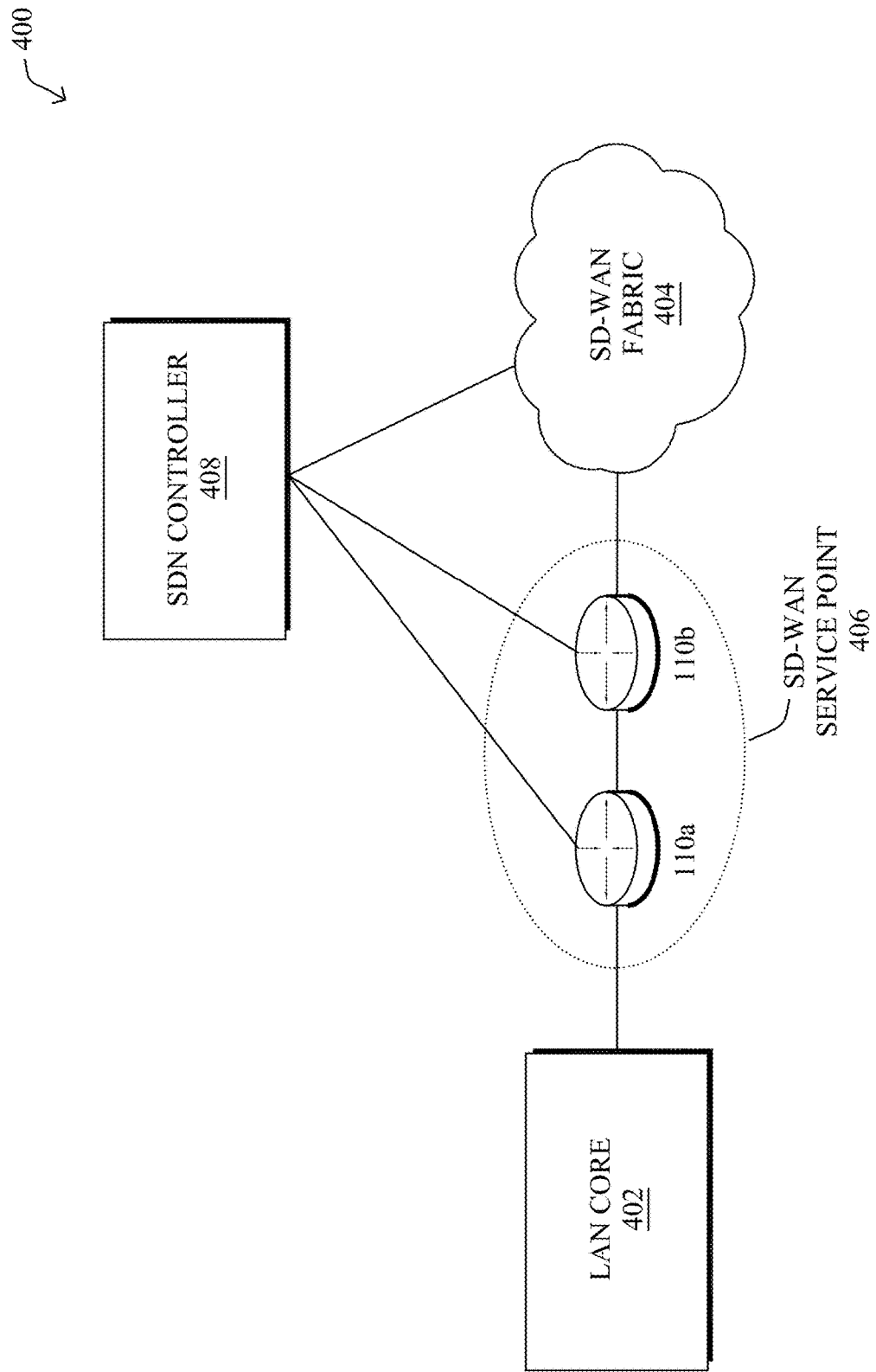
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, a primary networking goal may be to design and optimize the network to satisfy the requirements of the applications that it supports. So far, though, the two worlds of "applications" and "networking" have been fairly shoed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS. LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPE, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (IMP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
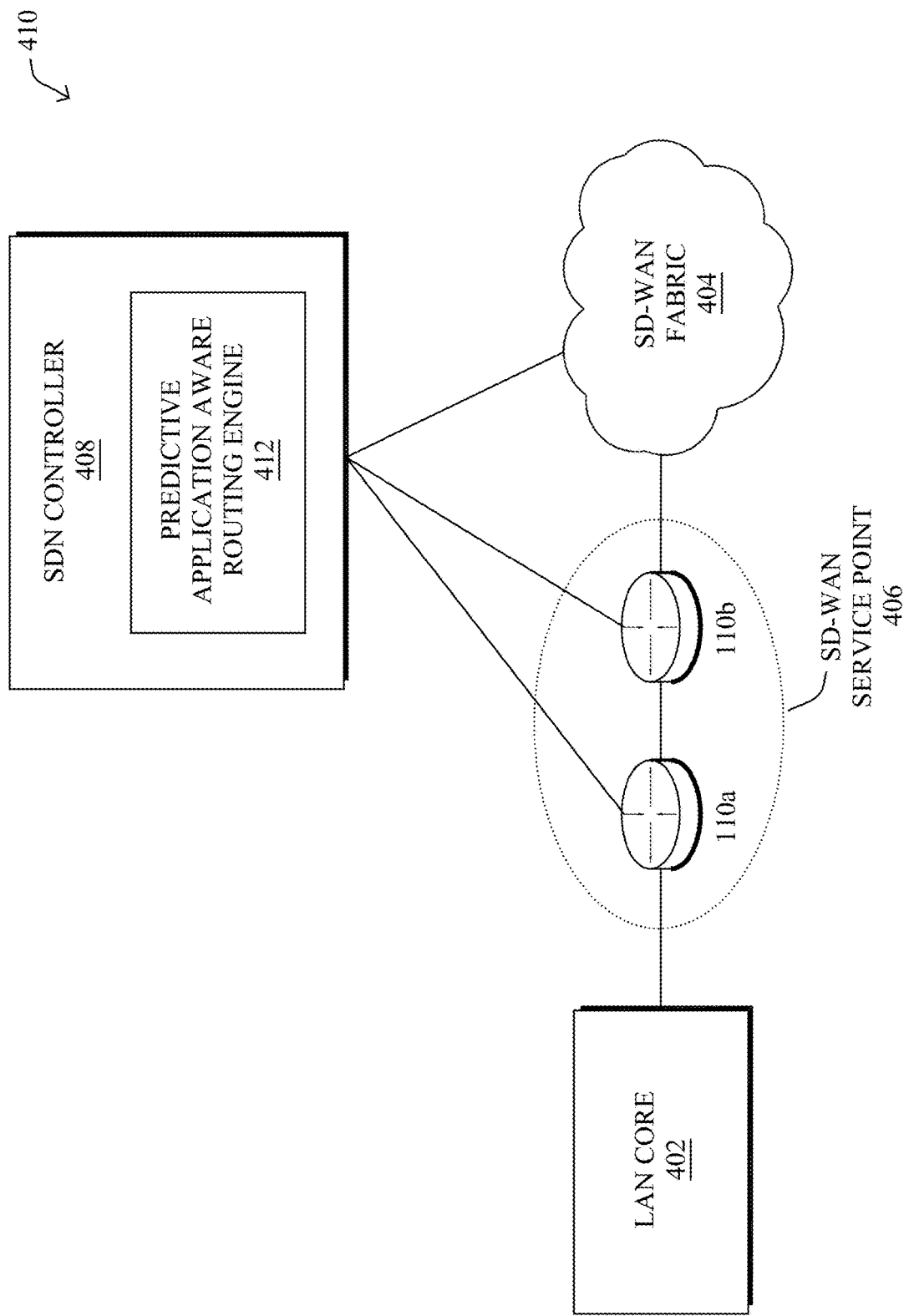

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As would be appreciated, network paths are extremely dynamic and their path metrics (e.g., delay/latency, loss, jitter, throughput, etc.) along with QoE of the application can vary greatly in their timeseries characteristics. Predicting/forecasting such dynamic application experience and network path metrics is one of the most important components in predictive routing systems, such as predictive application aware routing engine 412. While predictive routing systems can be built to be dynamic in nature, and to adapt quickly to the changing characteristics, the input that is supplied to these systems often remain the same in terms of the timeseries granularity and the length of the history provided. Testing has revealed that the granularity and length of history for the input can often be too small or too large based on the timeseries characteristics of the network path. Here, the granularity of a path metric refers to the frequency at which the path metric is measured and/or used as input to the prediction model.

For example, consider a network path whose path metrics are seasonal in nature (e.g., daily workday peaks) and quite stable. In such a case, an input to the predictive routing system at a minute-level granularity would be unnecessary, as the path does not exhibit any significant changes in its behavior at a high frequency. Given the stability/predictability of the path metrics, a more appropriate granularity for the would be at an hourly-level.

In contrast, now consider another network path whose path metrics do not exhibit any seasonality, but rather exhibit occasional, aperiodic spikes in its path metrics. To predict such aperiodic spikes, the predictive routing system would require input telemetry at the finest available granularity. However, the system would also not require a long history because such aperiodic peaks exhibit early-signs that help the prediction engine only for a short duration prior to the peak. The length of history could then be optimized to a shorter duration (e.g., the past two hours instead of the preset constant history).

Providing the predictive routing system with only the path metric measurements that are needed to sufficiently predict degradations can significantly reduce the amount of processing that is carried out by the system. Thus, an optimization for a predictive routing system may consist of maximizing the granularity of the path metrics used for the predictions, as well as minimizing the retained history of the metrics, while still satisfying a desired degree of prediction accuracy.

Dynamic Input Granularity Estimation for Network Path Forecasting Using Timeseries Features The techniques introduced herein allow for the estimation of the amount of granularity and length of input history for a network prediction model that is necessary to forecast without loss in accuracy or confidence. In some aspects, the techniques herein make use of use of time series features of the path metrics used as input to the prediction model, to determine the minimum amount of information needed to reliably make predictions regarding the network. By computing the maximum granularity and minimum history that results in acceptable model performance, the system is able to optimize the prediction mechanism to have the least computational overhead without a loss in accuracy. In further aspects, the techniques herein then translate the computed granularity and retention history for the path metrics into a telemetry collection policy for the network. In addition, the techniques herein may also be implemented in a dynamic manner such as by repeatedly monitoring the performance of the prediction model and adjusting the telemetry collection/reporting, accordingly (e.g., in the case of a detected network event or fluctuation in the performance of the model).

Illustratively, the techniques described herein may be performed by hardware, software, and/or firmware, such as in accordance with telemetry granularity control process 249, which may include computer executable instructions executed by the processor 220 (or independent processor of interfaces 210) to perform functions relating to the techniques described herein, such as in conjunction with the operation of predictive routing process 248.

Specifically, according to various embodiments, a device identifies peaks of a timeseries of a path metric used to predict performance of a path in a network. The device determines one or more characteristics of the peaks of the timeseries. The device computes, based on the one or more characteristics of the peaks, a measurement frequency for the path metric. The device causes the path metric to be measured in the network according to the measurement frequency.

Figure 5:
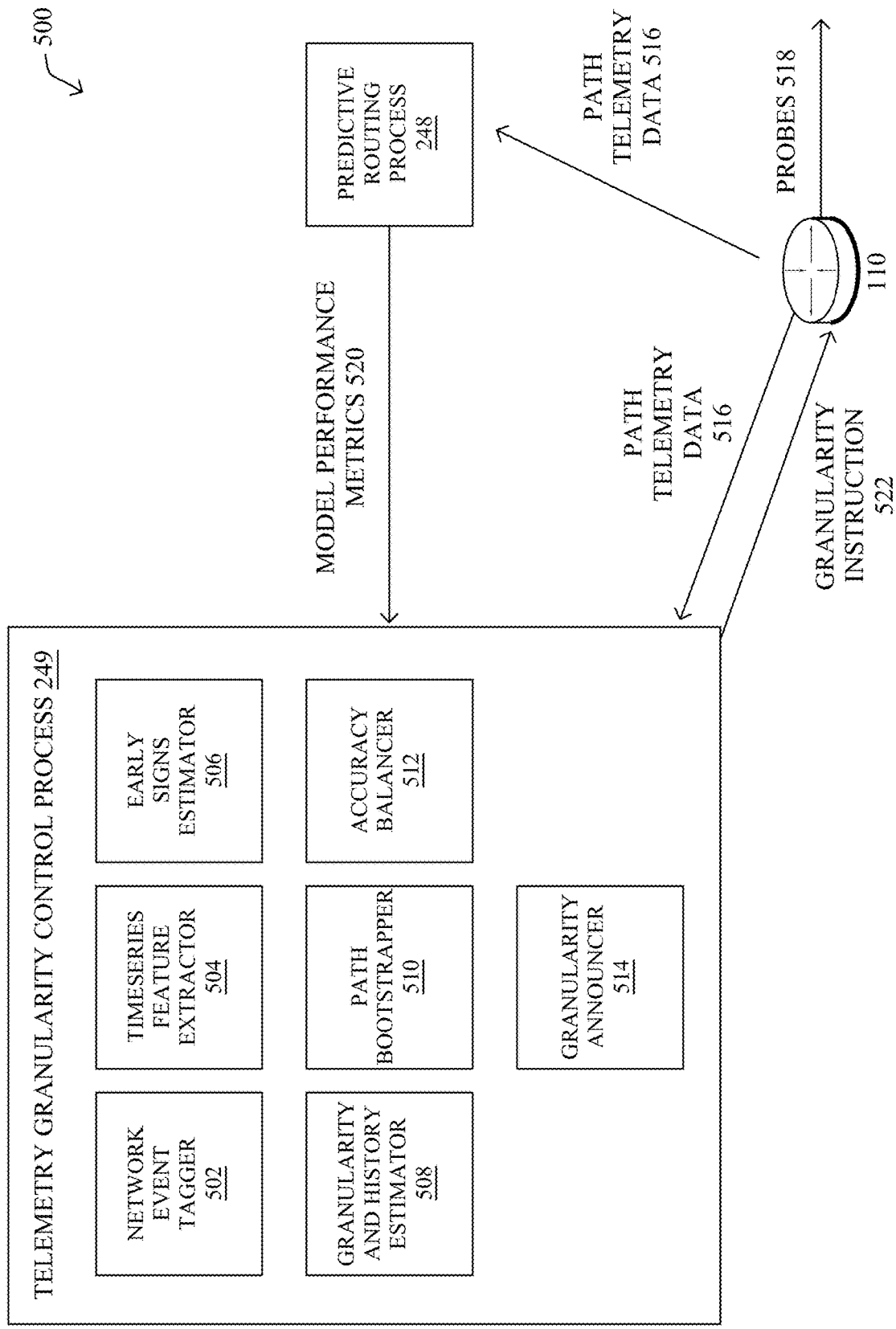
FIG. 5 illustrates an example architecture for dynamic input granularity estimation for network path forecasting using timeseries features.

Operationally, FIG. 5 illustrates an example architecture for dynamic input granularity estimation for network path forecasting using timeseries features, according is to various embodiments. At the core of architecture 500 is telemetry granularity control process 249, which may be executed by a controller for a network, a server, a networking device, or another device in communication therewith. For instance, telemetry granularity control process 249 may be executed by a controller for a network (e.g., SDN controller 408 in FIGS. 4A-4B, a path computation element, etc.), a particular networking device in the network (e.g., a router, etc.), another device or service in communication therewith, or the like. In further embodiments, architecture 500 may be implemented as part of a secure access service edge (SASE) deployment.

As shown, telemetry granularity control process 249 may include any or all of the following components: a network event tagger 502, a timeseries feature extractor 504, an early signs estimator 506, a granularity and history estimator 508, a path bootstrapper 510, an accuracy balancer 512, and/or a granularity announcer 514. As would be appreciated, the functionalities of these components may be combined or omitted, as desired. In addition, these components may be implemented on a singular device or in a distributed manner, in which case the combination of executing devices can be viewed as their own singular device for purposes of executing telemetry granularity control process 249.

As shown, telemetry granularity control process 249 may obtain path telemetry data 516 regarding the path metrics of a given path, such as its delay, loss, jitter, throughput, or the like. In some instances, telemetry granularity control process 249 may do so by directly communicating with a networking device, such as router 110 shown. In other instances, telemetry granularity control process 249 may obtain path telemetry data 516 indirectly, such as from a datalake or other repository to which path telemetry data 516 is reported.

One mechanism to measure the path metrics may be for router 110 at the edge of the network to send out probes 518 (e.g., BFD probes, HTTP probes, etc.) along a given network path (e.g., an SD-WAN tunnel, a direct Internet access path, etc.) at a certain frequency, on demand, and/or in response to the detection of a certain event in the network. Of course, other approaches to measuring the path metrics could also be used, is as discussed previously. For instance, path telemetry data 516 may also include NetFlow or other flow information that describes the application usage in the network. Beyond the path telemetry, telemetry granularity control process 249 (and/or predictive routing process 248) may also obtain QoE metrics regarding the application experience of a particular online application (e.g., based on user satisfaction ratings) (not shown). Such QoE metrics may take the form of a continuous number (e.g., a rating on a scale of 1-5), a discrete value (e.g., 'good,' 'degraded,' 'bad,' 'no opinion'), or combinations thereof.

In various embodiments, network event tagger 502 may be responsible for tagging/identifying network events of interest, such as conditions where the application experience is degraded. To do so, network event tagger 502 may take as input the path metrics indicated in path telemetry data 516 (e.g., loss, latency, etc.) and output the time periods that exhibit network events of interest. For example, network event tagger 502 may assess the loss, latency, jitter, etc. and tag the timestamps at which the SLA is violated for these path metrics. In another example, network event tagger 502 could monitor a probability of an SLA violation and tag the corresponding periods of time during which the probability goes from a lower value to a higher value within a specified amount of time. While network event tagger 502 may be executed in the cloud, in some instances, further embodiments also provide for network event tagger 502 to be executed directly on a networking device, such as router 110 shown.

In various embodiments, timeseries feature extractor 504 may extract different path metric timeseries from the path metrics in path telemetry data 516. In addition, in various embodiments, timeseries feature extractor 504 may also identify the features of the timeseries for the path metrics, such as the occurrences of peaks, the seasonality of peaks, the times for which seasonality is observed, the confidence of such determinations, etc.

Figure 6:
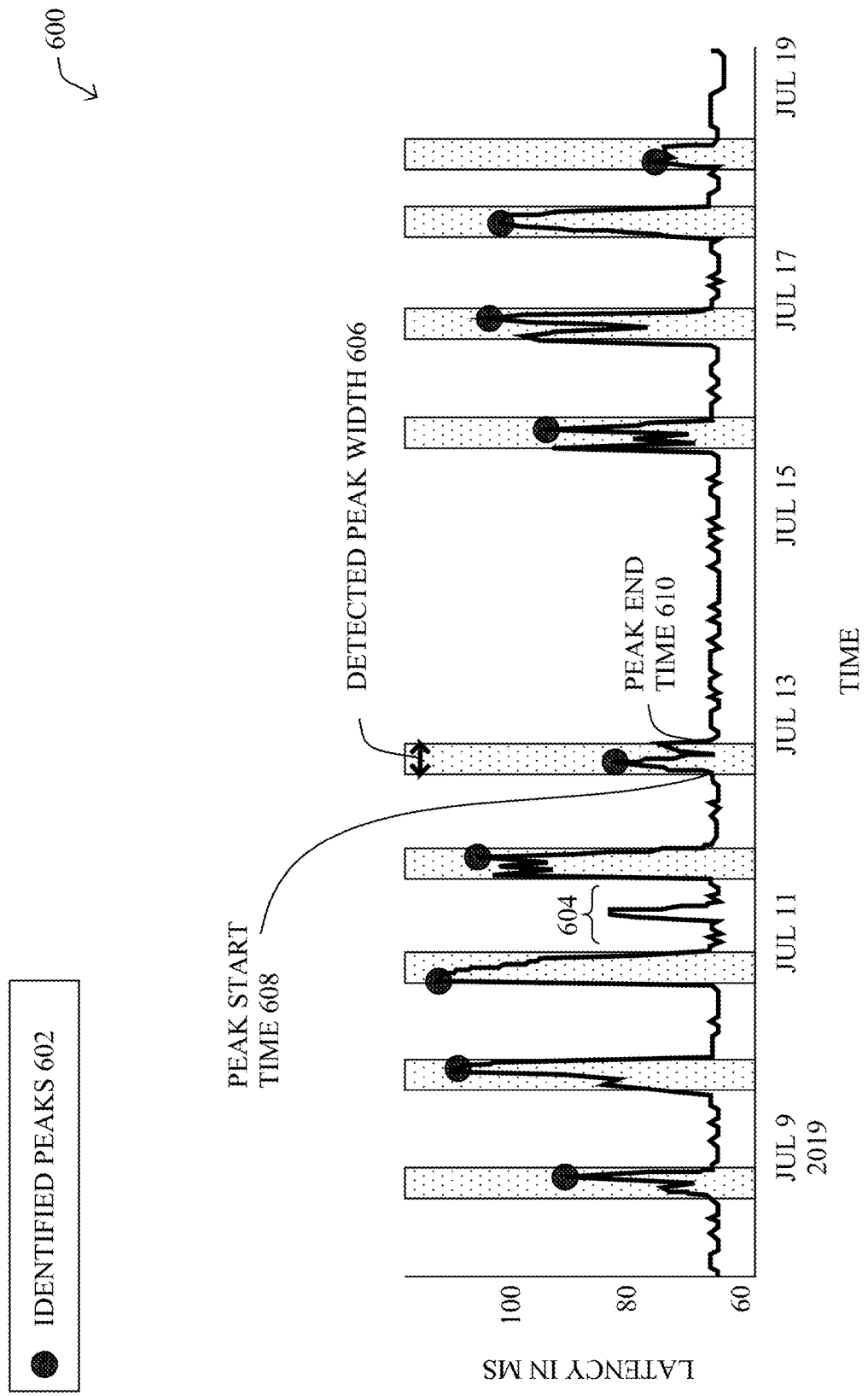
FIG. 6 illustrates an example timeseries of a measured path metric.

By way of example, FIG. 6 illustrates an example timeseries 600 of a measured path metric, according to various embodiments. More specifically, timeseries 600 represents the measured latency in milliseconds (ms) over the course of a number of days along a particular path in a network. Here, one of the features of timeseries 600 that timeseries feature extractor 504 may identify are its peaks 602, which represent localized maxima of the measured latency. In addition, for any given peak 602, timeseries feature extractor 504 may identify the characteristics of that peak, such as its start time 608, end time 610, and/or peak width 606.

To identify the peaks of a path metric timeseries and their characteristics, timeseries feature extractor 504 may enforce certain constraints during its analysis, such as any or all of the following:

Minimum peak height: The minimum height of a maxima that is computed from the base of the peak. This helps to filter out the noisy low-height peaks in the timeseries.

Minimum distance between two peaks: The minimum distance between any two consecutive maxima. For instance, given daily seasonality, two consecutive peaks can only occur on two different days, which implies a certain minimum amount of time between the two peaks. This constraint may also help to remove noisy peaks in the timeseries. For instance, while fluctuation 604 does demonstrate a spike in the latency, this constraint may cause timeseries feature extractor 504 to exclude fluctuation 604 from being considered a peak 602.

Maximum peak width: The maximum allowed width for a maxima of the timeseries to be considered a peak in the given context. The width may be calculated at the base of the peak. For instance, in the case of daily seasonality of a peak, timeseries feature extractor 504 may enforce a constraint that the peak cannot last longer than a certain number of hours in a day (i.e., less than 24 hours). This can help to eliminate classification of change-points as seasonal peaks.

Figure 7:
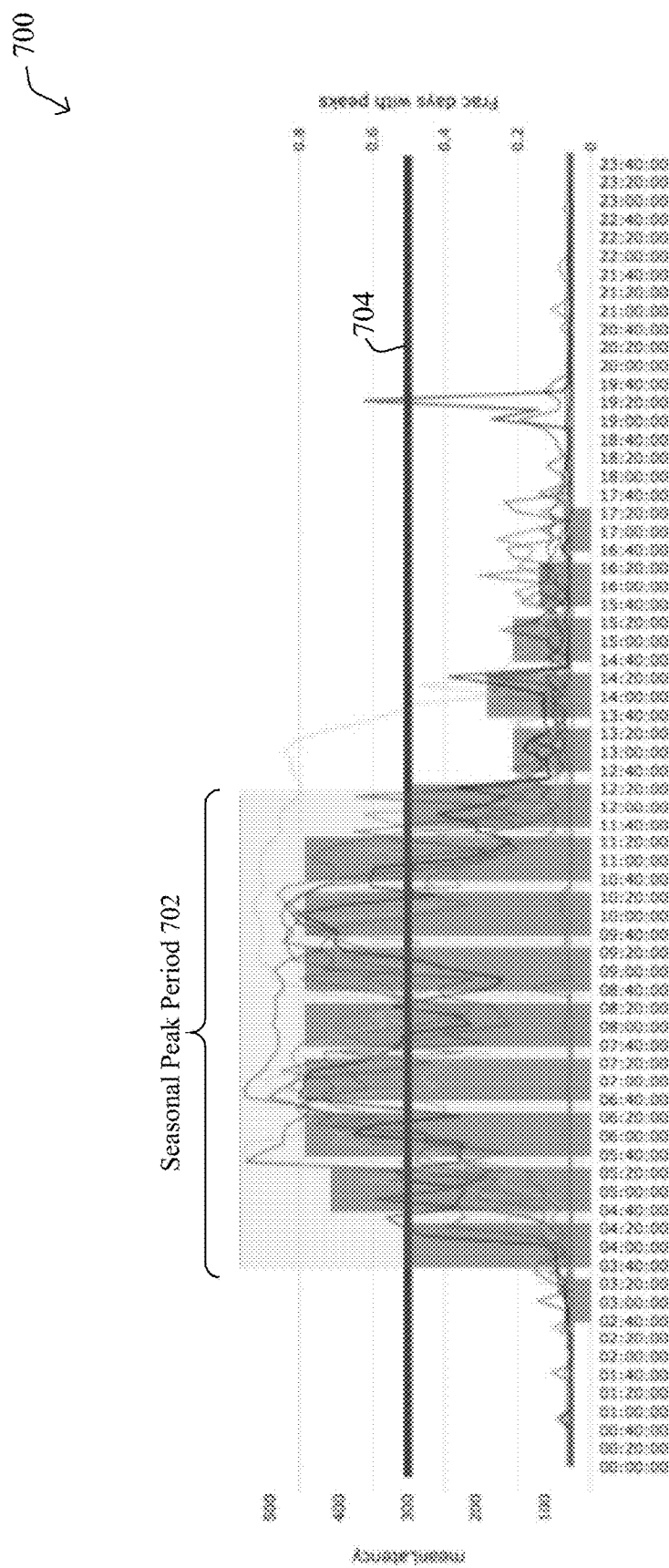
FIG. 7 illustrates an example plot of the distribution of timeseries peaks over time.

Once the peaks are identified, timeseries feature extractor 504 may also identify the seasonal peak period of the timeseries, which provides information on the time periods during which peaks are consistently observed. By way of example, FIG. 7 is illustrates an example plot 700 of the distribution of timeseries peaks over time. As can be seen, most peaks occur between 04:00-17:00 of a given day for this particular latency timeseries. Accordingly, timeseries feature extractor 504 may identify this time period 702 as being the seasonal peak period for the timeseries. Another such timeseries characteristic that timeseries feature extractor 504 may also identify relates to the fraction of days (or another time measurement) that exhibit peaks. Here, line 704 represents the dividing line for the fraction of days with peaks greater than 0.5.

Referring again to FIG. 5, it should also be noted that while timeseries feature extractor 504 may be executed in the cloud, other embodiments provide for it to be executed locally on a networking device, such as router 110. If executed at the edge of the network, for instance, the edge device may send the extracted timeseries features along with the network events tagged by network event tagger 502 for analysis by the other components of telemetry granularity control process 249 shown.

In various embodiments, early signs estimator 506 may take as input the network events tagged by network event tagger 502 and the path metrics from path telemetry data 516, and identify another potential characteristic of the peaks of the corresponding timeseries: any early signs of a peak being imminent. More specifically, early signs estimator 506 may estimate the time period that exists prior to a network event during which early signs pertaining to that network event were observed. For example, consider the case where the probability of an SLA violation goes from below 5% to above 10% (e.g., a network event). In such a case, early signs estimator 506 may identify the time period prior to this event in which the timeseries exhibited unusual fluctuations or other types of variations in the path metrics (or in another related set of path metrics), and tags that time period as an early sign of an impending peak or other network event exhibited by the time series. For instance, other example network events may include trends, change points in the path metrics, or the like. Note also that early signs estimator 506 may be cloud-hosted or hosted on a networking device, such as router 110, in various is embodiments.

Figure 8A:
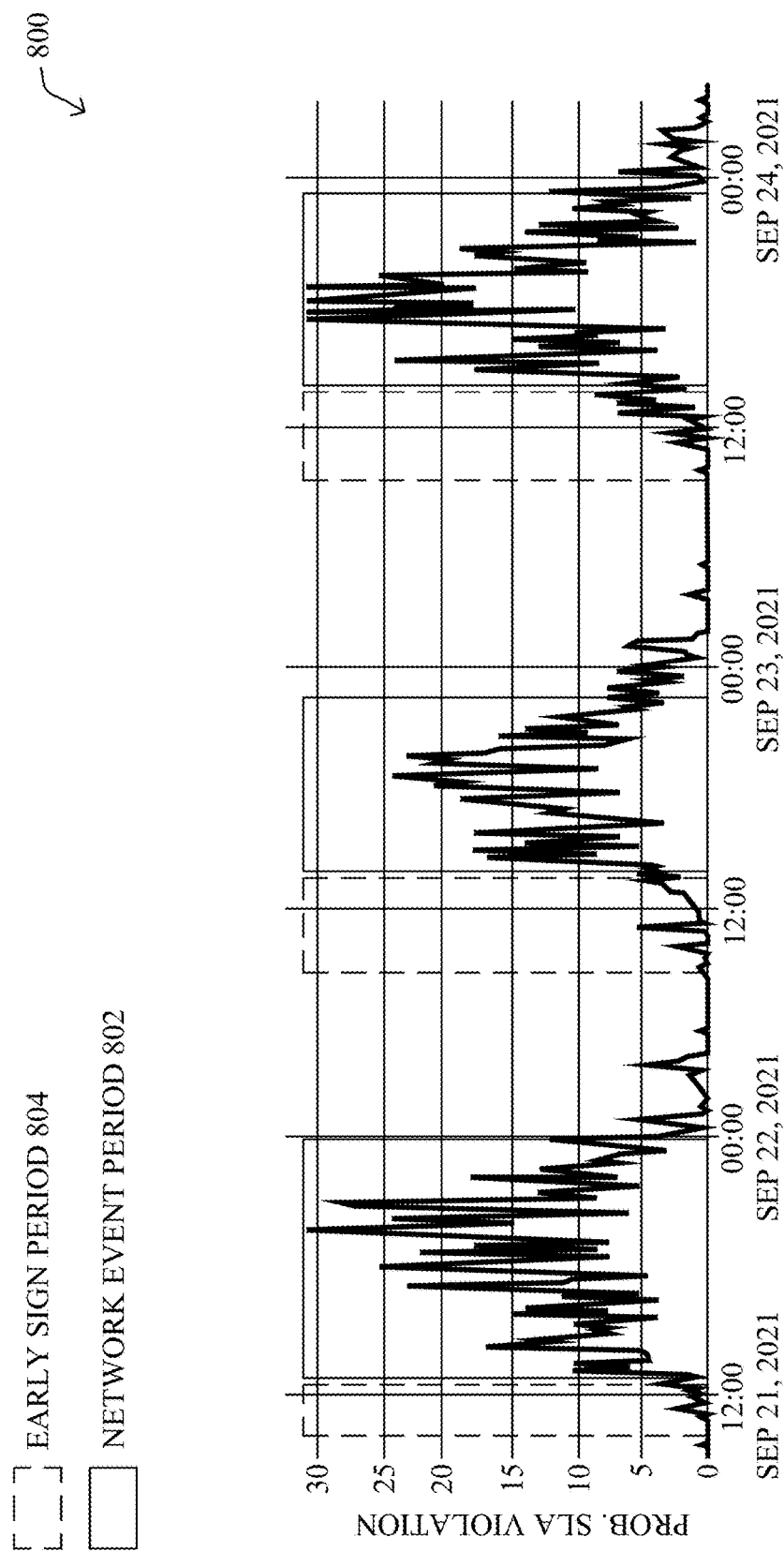
FIGS. 8A-8B illustrate example plots contrasting a path metric timeseries that exhibit early signs of peaks and a path metric timeseries that does not.

FIG. 8A illustrates an example plot 800 of a path metric timeseries having peaks that exhibit corresponding early sign time periods that precede them. More specifically, plot 800 shows the probability of an SLA violation of a given path over the course of a number of days. As can be seen, the system may detect a series of network event periods 802 (e.g., during which the timeseries exhibits peaks) that are seasonal in nature and typically occur daily. In addition, preceding each of these network event periods 802 may be early sign time periods 804 during which the probability of an SLA violation path metric begins to fluctuate. In one embodiment, these early sign periods 804 can provide hints to predictive routing process 248 on the impending network event and aid in predicting the same.

Figure 8B:
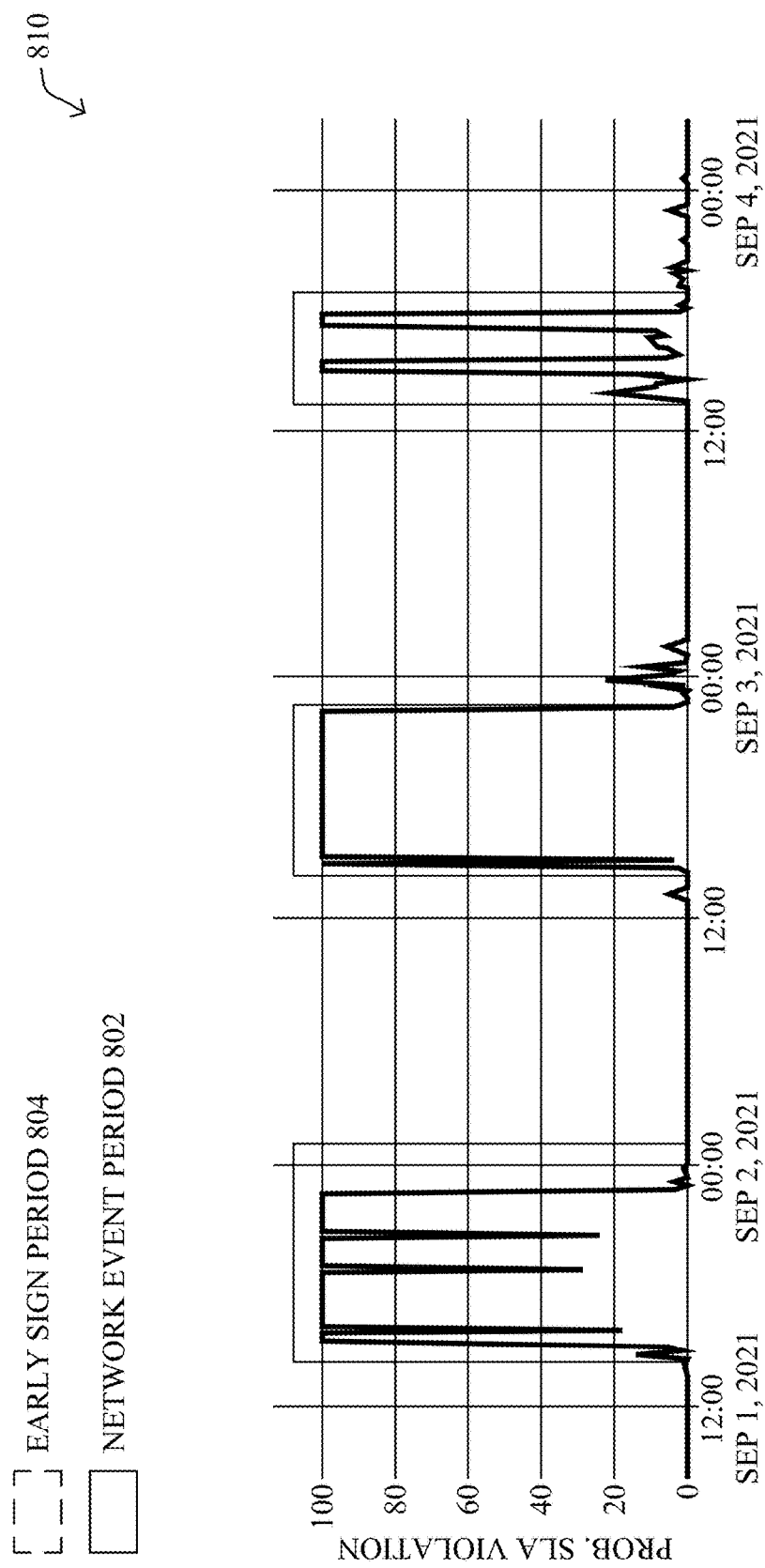

Consider now a different example timeseries plot 810 in FIG. 8B. Similar to FIG. 8A, FIG. 8B also illustrates a timeseries of the probability of an SLA violation path metric over time, but for a different network path. Here, the timeseries in plot 810 does not exhibit any significant early signs prior to a network event. In such a case, to predict such network events, predictive routing process 248 may rely exclusively on factors such as the periodicity of the events.

Referring yet again to FIG. 5, granularity and history estimator 508 may take as input any or all of the following: a.) the path metrics captured in path telemetry data 516, b.) information about the network events tagged by network event tagger 502, c.) information about the timeseries features extracted by timeseries feature extractor 504, and/or information about any early signs of network events identified by early signs estimator 506, in various embodiments. In turn, granularity and history estimator 508 may use this information to output an estimation of the granularity and/or length of history that should be used for the path metrics of a certain network path or cluster of paths having similar characteristics. Note that the input requirements can also vary for each of the different path metrics under consideration.

In addition to computing the measurement frequency/granularity for a certain path metric, granularity and history estimator 508 may also identify situations in which that is path metric should not be used by predictive routing process 248 for further predictions. For example, assume that all of the SLA violations along a network path are due to an increase in the fraction of loss along the path and that no network events or early signs are observed for the latency or jitter timeseries for the path, which are found to be uncorrelated. In such a case, granularity and history estimator 508 may determine a granularity and history duration for only the fraction of loss path metric and suggest discontinuing the use of latency and jitter for forecasting degradation along the path.

As would be appreciated, the coarser the granularity of a given path metric, the lower the amount of information it provides about the timeseries. Indeed, measuring the latency along a path at a relatively low measurement frequency/coarse granularity (e.g., every hour) will provide less information about the true performance of the path than at a higher measurement frequency/fine granularity (e.g., every ten minutes). Thus, it is important for any higher granularity of the path metrics to preserve the information on network events and early signs that were observed at a finer granularity. Accordingly, granularity and history estimator 508 may determine the maximum possible granularity (i.e., lowest measurement frequency) such that all or most of the information in the raw timeseries is preserved.

Figure 9A:
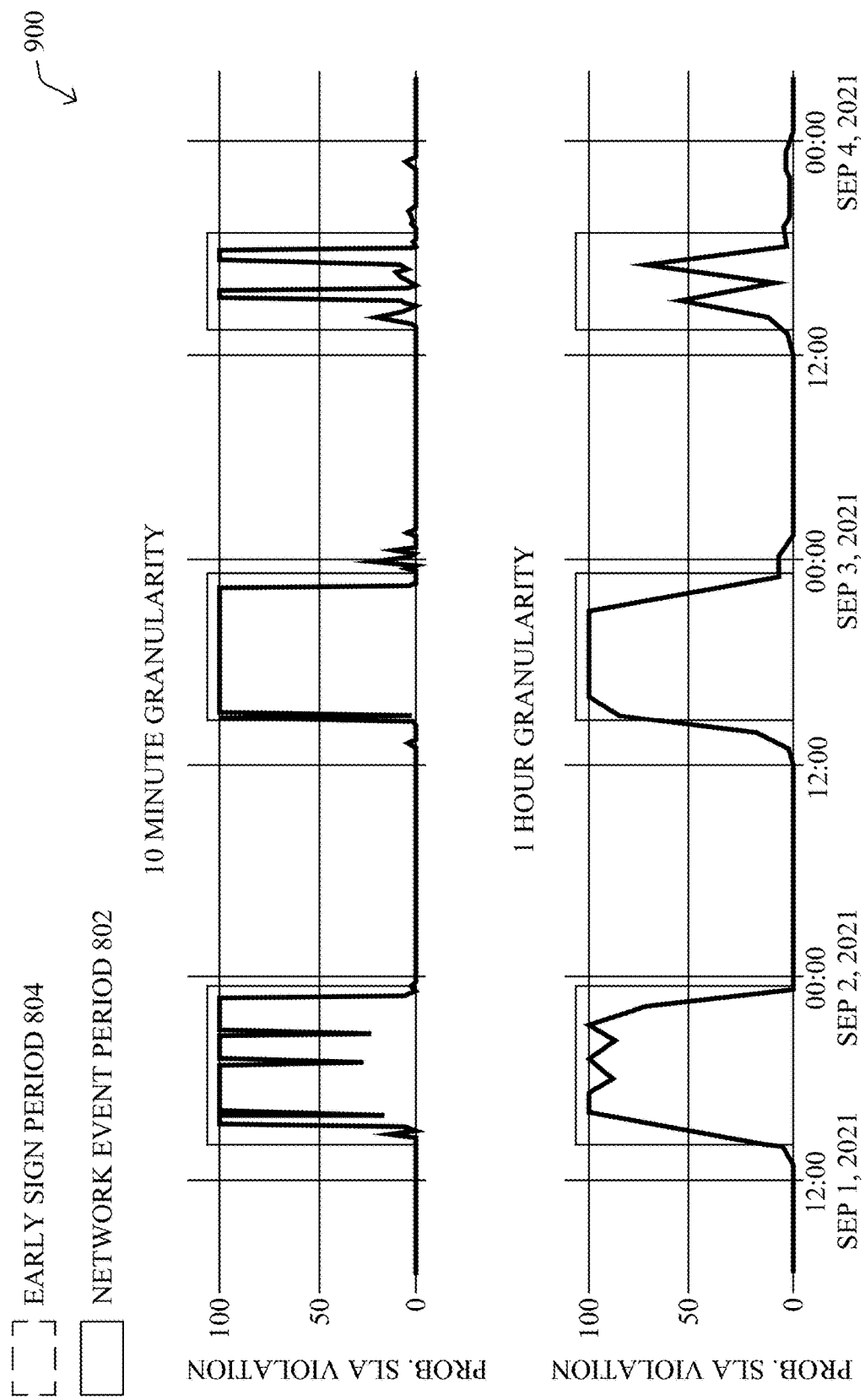
FIGS. 9A-9B illustrate example plots contrasting path metric timeseries at different measurement granularities.

By way of example, FIG. 9A illustrates an example plot 900 comparing the results of measuring a timeseries of the probability of an SLA violation path metric at a granularity/measurement frequency of every ten minutes to that of a granularity/measurement frequency of every hour. As can be seen, even at a coarser granularity of one hour measurement intervals, information about the detected peaks is preserved. In such a case, granularity and history estimator 508 may opt to configure a granularity of one hour for this metric.

Figure 9B:
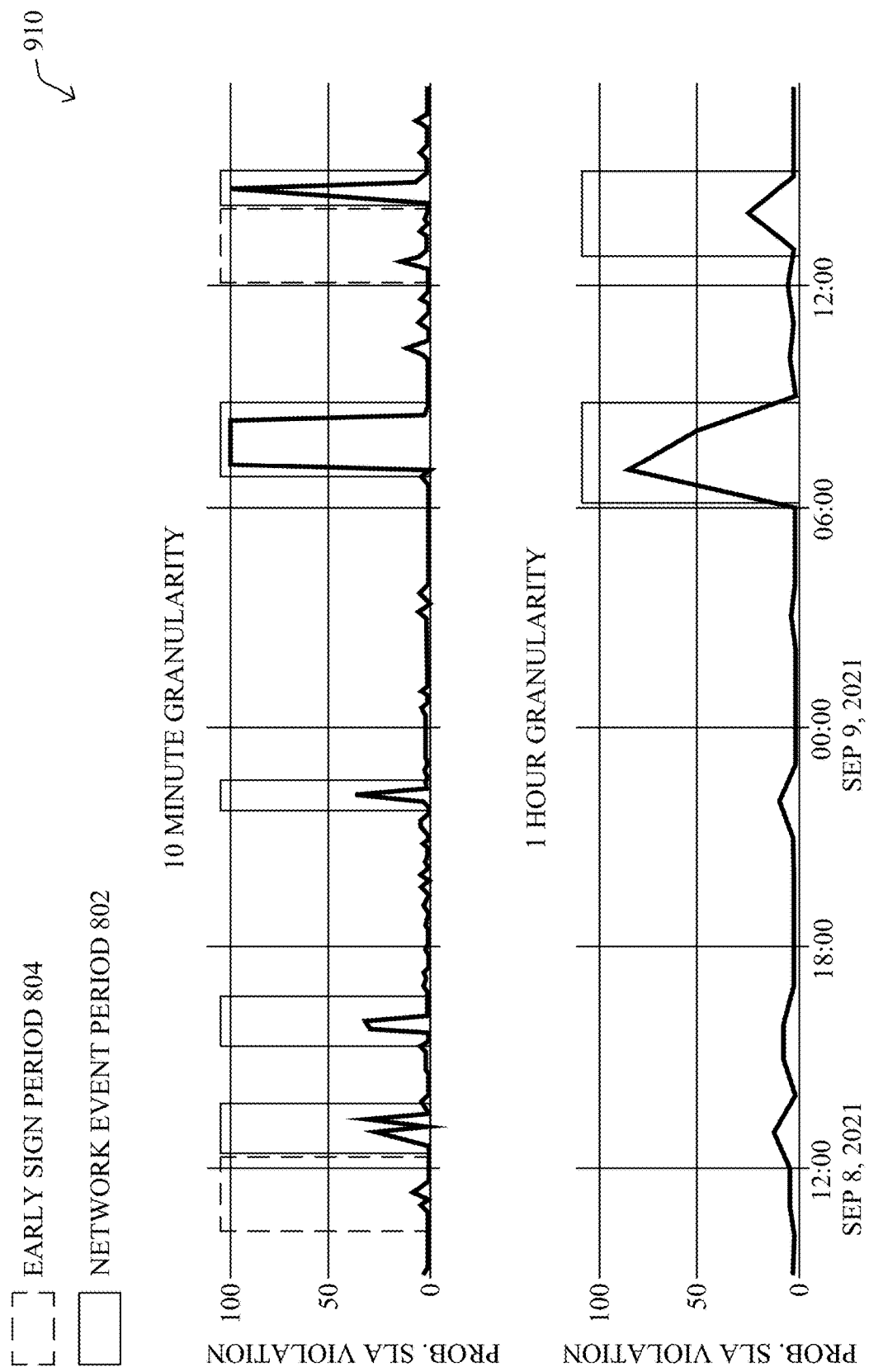

In contrast, as shown in plot 910 in FIG. 9B, using a granularity of one hour would significantly reduce the amount of information that can be obtained about the probability of an SLA violation path metric. Indeed, at a granularity of ten minutes, the system may be able to identify five multiple peaks/events over the course of a day, some of which also exhibit early signs. However, when a coarser granularity of one hour is used for the same timeseries, the system may only be able to detect two such peaks/events, meaning that information about the other three are lost because of aggregation (average) and none of the early signs are preserved. This most definitely would cause a decrease in the accuracy of the prediction model and visibility into the behavior of the path. In such a case, granularity and history estimator 508 may elect to use a granularity/measurement frequency of ten minutes for the path metric.

Referring again to FIG. 5, granularity and history estimator 508 may also estimate the minimum required length-of-history for a given network path, in order for predictive routing process 248 to achieve satisfactory prediction accuracy, in various embodiments. In one embodiment, granularity and history estimator 508 may use the information on the timeseries features, network events and early signs (if detected), to estimate the amount of history required to confidently predict a certain network event.

For example, consider a path metric timeseries exhibit seasonality. In such a case, granularity and history estimator 508 may examine the timeseries features corresponding to the seasonal peak occurrences and the hours-of-day which exhibit seasonality. Considering how stable/predictable the seasonality is, granularity and history estimator 508 may dynamically decide the length of history that establishes a confident seasonality interval (e.g., time period 702 in FIG.), which it can use to estimate such the confidence corresponding to a certain length of history.

In another example, consider a network path whose path metrics exhibit aperiodic behaviors. The timeseries features like peak intervals, peak occurrence frequency, etc. would clearly establish that there does not exist any level of seasonality for the timeseries. This implies that predictive routing process 248 would not require any lengthy history to establish/learn the seasonal intervals. Instead, granularity and history estimator 508 could set a shorter span of history say, the past 6 hours, which it may deem sufficient to predict aperiodic peaks, if there are any early signs being exhibited. Another approach would be to estimate the length of history from the early signs information available for the same network path, if any exist. For instance, the average or maximum is time period for which early signs are observed could be set as the length of history required for aperiodic signals.

In various embodiments, path bootstrapper 510 may be responsible for determining the granularity and/or history length for the path metrics of a path when there is not enough path telemetry data 516 currently available for granularity and history estimator 508 to make such decisions. This can be the case, for instance, in the case of new SD-WAN tunnels or the like. In one embodiment, when a new path with little data needs to be estimated, path bootstrapper 510 may identify the most similar path to the new path, and then apply the granularity and history from it to the new path.

For example, path bootstrapper 510 may, for every granularity $g_i$, the time series of the path P is compared with every other path P'. In turn, path bootstrapper 510 may then compare the time series distance between P and P', d(P, P', $g_i$), using an approach such as Dynamic Time Warping (DTW). Path bootstrapper 510 may then pick the nearest path P' as most similar path which has the least distance for every granularity $g_i$.

If there is no specific path which is the smallest for all granularities, path bootstrapper 510 may compute a weighted distance metric, which weights the distance d(P, P', $g_i$) for each granularity. This weighted distance is used for selecting the most representative path P' to inherit the granularity. In other embodiments, path bootstrapper 510 may identify the k-nearest neighbors of the time series (based on a time-series distance metric) and take the granularity and history of a majority of the k-nearest neighbors for the new path.

In various embodiments, accuracy balancer 512 may take as input: a.) the estimated input timeseries requirements, b.) model performance metrics 520 regarding the accuracy of the prediction model of predictive routing process 248, and/or c.) the resource costs associated with the execution of predictive routing process 248. The main task of accuracy balancer 512 is to monitor the accuracy and the confidence level of the forecasts being produced by the prediction model of predictive routing process 248. More specifically, accuracy balancer 512 may evaluate the accuracy of the prediction model, taking into account the automatically computed granularity and required history performed by the system, to evaluate whether the proposed granularity and history provides the required accuracy.

Accuracy balancer 512 may be run periodically or under other circumstances, such as when there are fluctuations observed in the accuracy of the predictions. Accuracy balancer 512 may also be run on detection of an interesting event. For example, a BGP route change event may trigger reevaluation of the model accuracy by accuracy balancer 512. When the accuracy of the prediction model falls below an acceptable level, accuracy balancer 512 may notify the other components of telemetry granularity control process 249, so as to compute a new granularity and history duration for the path metrics.

In some implementations, accuracy balancer 512 may also all of the information regarding the performance of the prediction model and the current configuration to a user interface for review by a network administrator. In some cases, accuracy balancer 512 may only trigger a configuration change in response to a request from the user interface to do so, potentially also presenting the proposed change(s) to the administrator, first. For instance, accuracy balancer 512 may indicate that the proposed granularity and history may have an impact on the accuracy of the predictions, but reduce the amount of telemetry data to be gathered and stored.

By way of example, the information provided to the user could include any or all of the following: estimated granularity and length of history, the decision process corresponding to the estimates, model performance for the particular estimates, current cloud costs, cloud cost savings that could be achieved if the estimates were to be implemented, etc. This information can be provided either per network path or for path-clusters consisting of network paths with similar timeseries characteristics. The administrator may also be able to apply their decision to a single path or to an entire path-cluster, as well.

Finally, telemetry granularity control process 249 may also include granularity announcer 514, which is responsible for causing the determined granularity and history is duration to be used in the network for the path metrics of a given path. For instance, as shown, granularity announcer 514 may send granularity instruction 522 to router 110 that includes instructions to measure the latency of a given path by sending probes 518 along that path at a specified frequency. In addition, an instruction regarding the required history for such path metrics could also be sent such that the path telemetry data 516 consumed by the prediction model of predictive routing process 248 are limited to the determined span of time. Of course, granularity announcer 514 may also control the granularity and history duration indirectly, as well, such as by announcing them to another system that oversees the collection and reporting of path telemetry data 516.

In addition, while the signaled granularity typically controls the measurement of the path metrics from the standpoint of the device(s) actually generating path telemetry data 516, other embodiments also provide for the granularity to instead control the measurement frequency from the standpoint of any receiver of path telemetry data 516. For instance, router 110 may still measure the path metrics of a given path at a finer graduality, for whatever reason, and only provide those path metrics at the indicated frequency.

Figure 10:
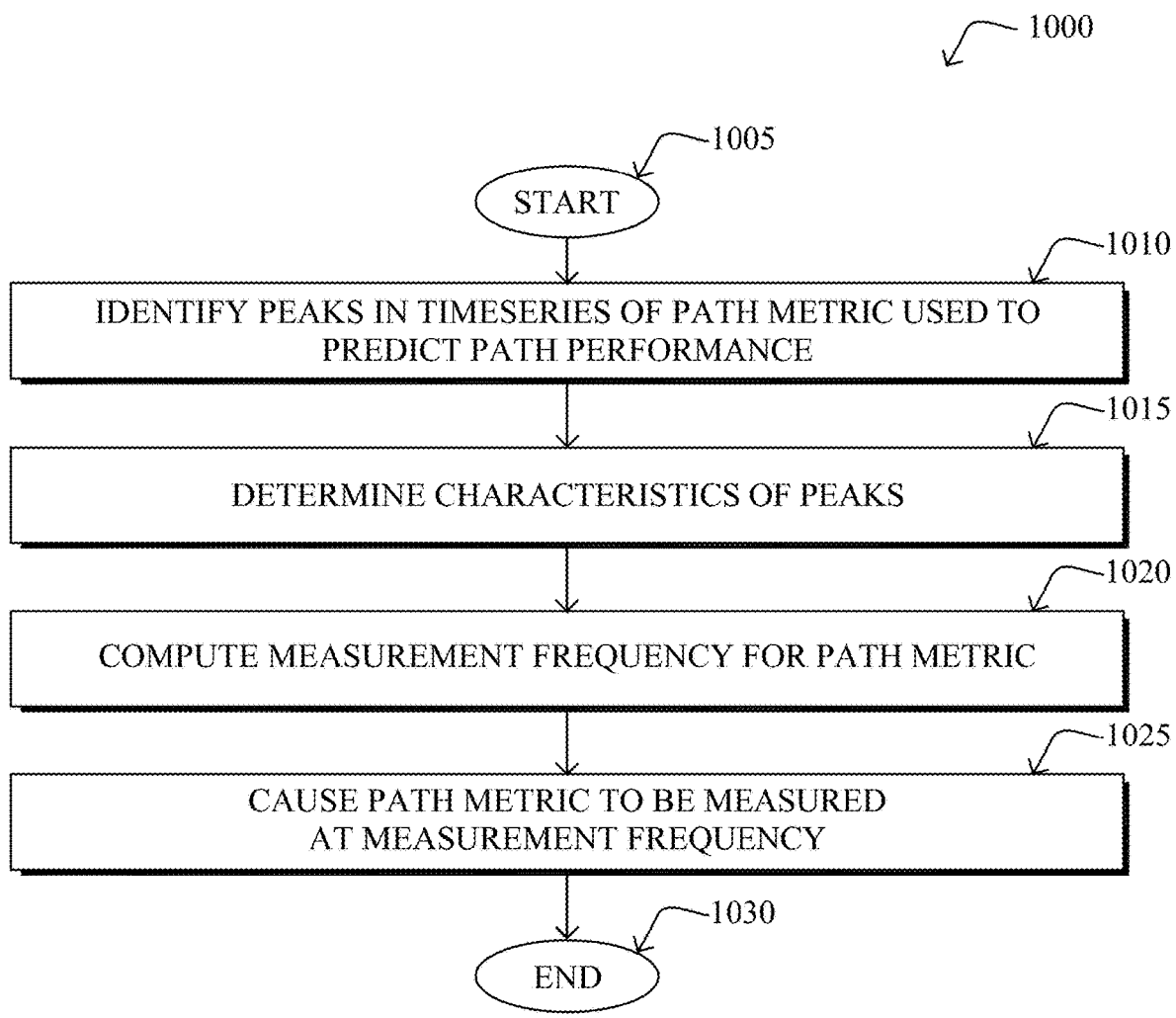
FIG. 10 illustrates an example simplified procedure for dynamic input granularity estimation for network path forecasting using timeseries features.

FIG. 10 illustrates an example simplified procedure for dynamic input granularity estimation for network path forecasting using timeseries features, in accordance with one or more embodiments described herein. For example, a non-generic, specifically configured device (e.g., device 200), such as controller for a network (e.g., an SDN controller), a server (e.g., a server associated with the online application), a networking device, or any other device in communication therewith, may perform procedure 1000 by executing stored instructions (e.g., process 249). The procedure 1000 may start at step 1005, and continues to step 1010, where, as described in greater detail above, the device may identify peaks of a timeseries of a path metric used to predict performance of a path in a network. In various embodiments, the path metric is indicative of at least one of: delay, loss, jitter, or throughput of the path. In some embodiments, the peaks of the timeseries identified by the device satisfy an imposed minimum peak height or a is maximum peak width. In further embodiments, the device may do so by excluding a fluctuation in the timeseries as a peak based on a required minimum amount of time between peaks.

At step 1015, as detailed above, the device may determine one or more characteristics of the peaks of the timeseries. In one embodiment, the one or more characteristics of the peaks of the timeseries indicate whether the peaks of the timeseries are periodic or aperiodic. In a further embodiment, the one or more characteristics of the peaks of the timeseries indicate whether the peaks of the timeseries are preceded by patterns that signal that a peak is imminent.

At step 1020, the device may compute, based on the one or more characteristics of the peaks, a measurement frequency for the path metric, as described in greater detail above. In some embodiments, the device computes the measurement frequency based further in part on an accuracy measurement for a prediction model. In another embodiment, the device may also compute, based on the one or more characteristics of the peaks, a length of history of the path metric to be retained. In further embodiments, the device may also identify a second path in the network as being similar to that of the path and compute, based on the measurement frequency, a second measurement frequency for the second path.

At step 1025, as detailed above, the device may cause the path metric to be measured in the network according to the measurement frequency. In some embodiments, the path metric is used to predict performance of the path by a prediction model of a routing engine that reroutes traffic conveyed via the path onto another path in the network in advance of a predicted degradation of the path metric. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the is embodiments herein.

While there have been shown and described illustrative embodiments that provide for dynamic input granularity estimation for network path forecasting using timeseries features, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   identifying, by a device, peaks of timeseries information of a path metric, wherein the path metric is used to predict performance of a path in a network and is indicative of at least one of: delay, loss, jitter, or throughput of the path;

determining, by the device, one or more characteristics of the peaks of the timeseries information;

computing, by the device and based on the one or more characteristics of the peaks, a measurement frequency for the path metric; and causing, by the device, the path metric to be measured in the network according to the measurement frequency.

2. The method as in claim 1, wherein the peaks of the timeseries information identified by the device satisfy an imposed minimum peak height or a maximum peak width.

3. The method as in claim 1, wherein the one or more characteristics of the peaks of the timeseries information indicate whether the peaks of the timeseries information are periodic or aperiodic.

4. The method as in claim 1, wherein identifying the peaks of the timeseries information comprises:

excluding a fluctuation in the timeseries information as a peak based on a required minimum amount of time between peaks.

5. The method as in claim 1, wherein the one or more characteristics of the peaks of the timeseries information indicate whether the peaks of the timeseries information are preceded by patterns that signal that a peak is imminent.

6. The method as in claim 1, wherein the path metric is used to predict performance of the path by a prediction model of a routing engine that reroutes traffic conveyed via the path onto another path in the network in advance of a predicted degradation of the path metric.

7. The method as in claim 6, wherein the device computes the measurement frequency based further in part on an accuracy measurement for the prediction model.

8. The method as in claim 1, further comprising:

computing, by the device and based on the one or more characteristics of the peaks, a length of history of the path metric to be retained.

9. The method as in claim 1, further comprising:

identifying, by the device, a second path in the network as being similar to that of the path based on a comparison of timeseries information of the second path to the timeseries information relating to the path metric; and computing, by the device and based on the measurement frequency, a second measurement frequency for the second path.

10. An apparatus, comprising:

one or more network interfaces;

a processor coupled to the one or more network interfaces and configured to execute one or more processes; and a memory configured to store a process that is executable by the processor, the process when executed configured to:

identify peaks of timeseries information of a path metric, wherein the path metric is used to predict performance of a path in a network and is indicative of at least one of: delay, loss, jitter, or throughput of the path;

determine one or more characteristics of the peaks of the timeseries information;

compute, based on the one or more characteristics of the peaks, a measurement frequency for the path metric; and cause the path metric to be measured in the network according to the measurement frequency.

11. The apparatus as in claim 10, wherein the peaks of the timeseries information identified by the apparatus satisfy an imposed minimum peak height or a maximum peak width.

12. The apparatus as in claim 10, wherein the one or more characteristics of the peaks of the timeseries information indicate whether the peaks of the timeseries information are periodic or aperiodic.

13. The apparatus as in claim 10, wherein the apparatus identifies the peaks of the timeseries information by:

excluding a fluctuation in the timeseries information as a peak based on a required minimum amount of time between peaks.

14. The apparatus as in claim 10, wherein the one or more characteristics of the peaks of the timeseries information indicate whether the peaks of the timeseries information are preceded by patterns that signal that a peak is imminent.

15. The apparatus as in claim 10, wherein the path metric is used to predict performance of the path by a prediction model of a routing engine that reroutes traffic conveyed via the path onto another path in the network in advance of a predicted degradation of the path metric.

16. The apparatus as in claim 15, wherein the apparatus computes the measurement frequency based further in part on an accuracy measurement for the prediction model.

17. The apparatus as in claim 10, wherein the process when executed is further configured to:

compute, based on the one or more characteristics of the peaks, a length of history of the path metric to be retained.

18. The apparatus as in claim 10, wherein the process when executed is further configured to:

identify a second path in the network as being similar to that of the path based on a comparison of timeseries information of the second path to the timeseries information relating to the path metric; and compute, based on the measurement frequency, a second measurement frequency for the second path.

19. A tangible, non-transitory, computer-readable medium storing program instructions that cause a device to execute a process comprising:

identifying, by the device, peaks of timeseries information of a path metric, wherein the path metric is used to predict performance of a path in a network and is indicative of at least one of: delay, loss, jitter, or throughput of the path;

determining, by the device, one or more characteristics of the peaks of the timeseries information;

computing, by the device and based on the one or more characteristics of the peaks, a measurement frequency for the path metric; and causing, by the device, the path metric to be measured in the network according to the measurement frequency.

* * * * *